Sept. 18, 1962 W. D. FISH 3,054,465
ROCK DRILL ROTATION MECHANISM
Filed Nov. 12, 1958 3 Sheets-Sheet 1

INVENTOR.
WALTER D. FISH
BY
Charles F. Osgood,
ATTORNEY

Sept. 18, 1962 W. D. FISH 3,054,465
ROCK DRILL ROTATION MECHANISM
Filed Nov. 12, 1958 3 Sheets-Sheet 2
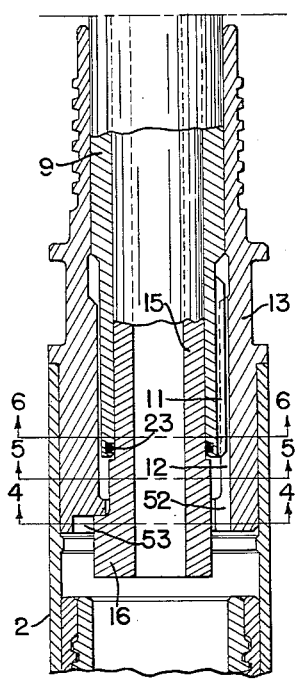
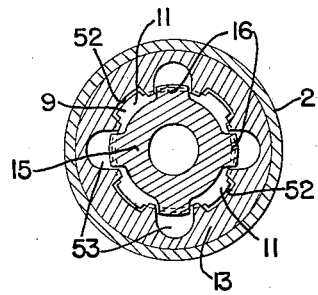
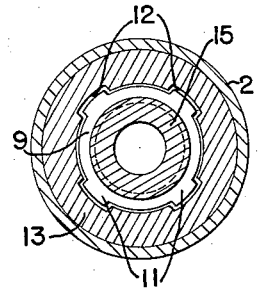
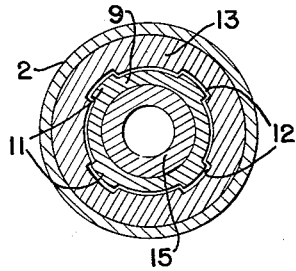
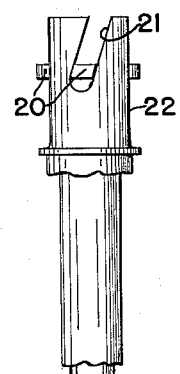
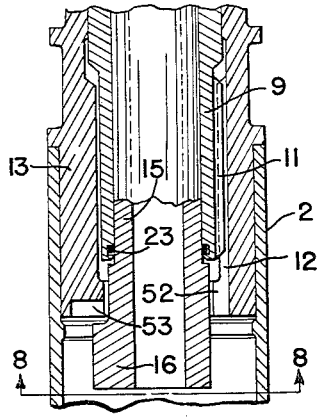
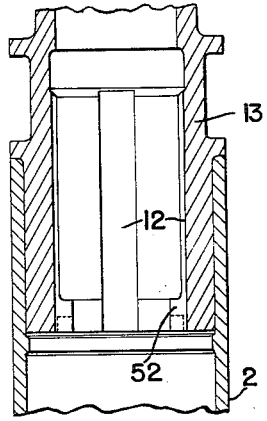
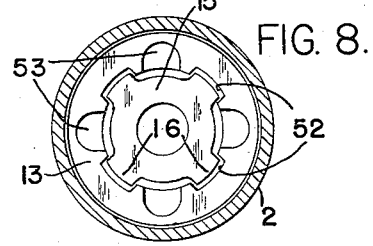
INVENTOR.
WALTER D. FISH
BY Charles F. Osgood,
ATTORNEY Sept. 18, 1962 W. D. FISH 3,054,465
ROCK DRILL ROTATION MECHANISM
Filed Nov. 12, 1958 3 Sheets-Sheet 3
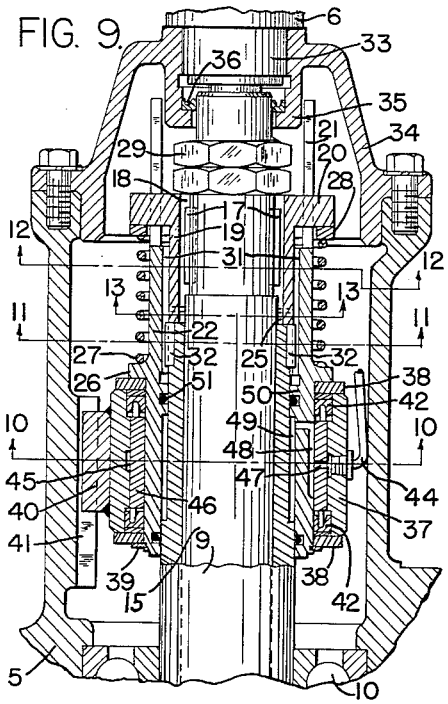
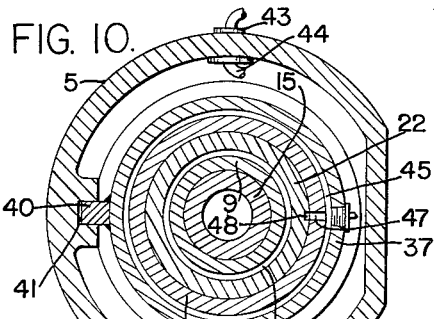
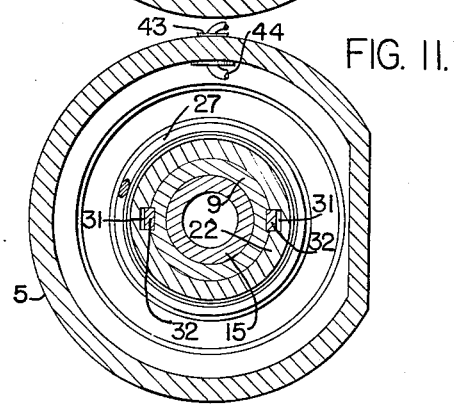
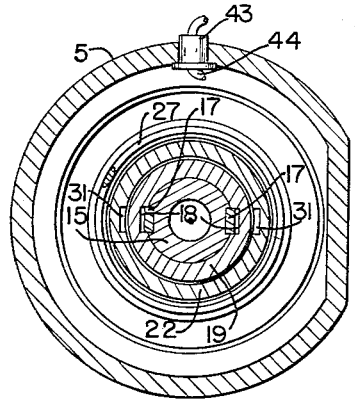
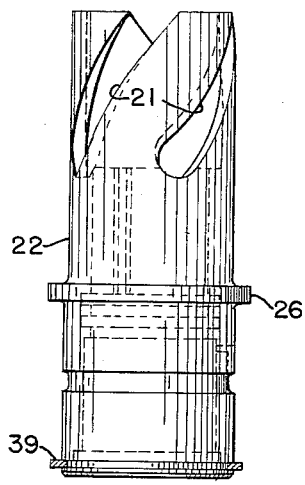
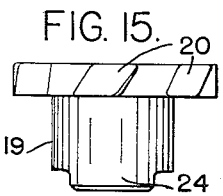
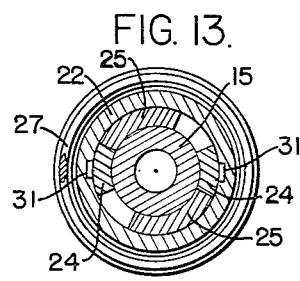
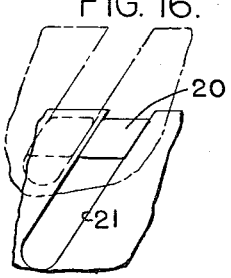
INVENTOR.
WALTER D. FISH
BY Charles F. Osgood
ATTORNEY United States Patent Office 3,054,465
Patented Sept. 18, 1962

3,054,465
ROCK DRILL ROTATION MECHANISM
Walter D. Fish, Claremont, N.H., assignor to Joy Manufacturing Company, Pittsburgh, Pa., a corporation of Pennsylvania
Filed Nov. 12, 1958, Ser. No. 773,208
10 Claims. (Cl. 175—185)

This invention relates to rock drills for drilling blast holes in an earth formation and more particularly to a rotation mechanism for the drill bit of a blast hole drill.

In rotary rock drills of the type known as the "Joy Downholer" such as that disclosed in Patent No. 2,871,826 owned by Joy Manufacturing Company, applicant's assignee an impact tool is carried by the rod line and follows the drill bit into the hole being drilled and as impact blows are imparted to the drill bit, the drill rod line is rotated thereby to rotate the drill bit. As the drill bit is rotated and percussively actuated, pressure fluid may be conducted down through the rod line to the drill bit to blow away the cuttings from the bit face and out from the drill hole. In such drills the drill rod line is desirably made up of sections suitably coupled together and provided with a rear coupling and during bit rotation the rear coupling is connected by releasable locking means to the rod line rotating mechanism of the drill, and such locking means is releasable to permit detachment of the rod line from the drill rotation mechanism.

It is therefore an object of the present invention to provide an improved rotation mechanism for a rock drill. Another object is to provide improved means for locking the drill rod line to the drill rotating element and releasable at will to permit detachment of the rod line from the rotating element. Yet another object is to provide an improved releasable fluid operated lock having a locking rod extending axially through the tubular drill spindle of the rotating mechanism and rotatable relative to the spindle into and out of locking position by means of a fluid actuated piston embodied in the drill rotating mechanism. A further object is to provide an improved fluid actuated device arranged at the rear portion of the drill rotating mechanism and having a front locking portion engageable within the rear coupling of the drill rod line for locking the latter to a rotating element of the drill rotation mechanism. Other objects and advantages of the invention will, however, hereinafter more fully appear.

In the accompanying drawings there is shown for purposes of illustration one form which the invention may assume in practice.

In these drawings:

FIGS. 1 and 2, taken together, constitute a longitudinal axial section through a drill rotating mechanism embodying an illustrative form of the invention.

FIG. 3 is a fragmentary view taken in the plane of FIG. 2, showing the rod line lock in a forward position.

FIGS. 4, 5 and 6 are cross sections taken respectively on lines 4—4, 5—5 and 6—6 of FIG. 2, showing details of the locking means.

FIG. 7 is an elevational view, partially broken away, showing some of the rotation and lock parts in detail.

FIG. 8 is a cross section taken on line 8—8 of FIG. 3, with the locking rod turned 45° into released position.

FIG. 9 is a fragmentary view of the upper portion of the drill mechanism shown in FIG. 1, showing the actuator piston in retracted lock releasing position.

Figure 1:
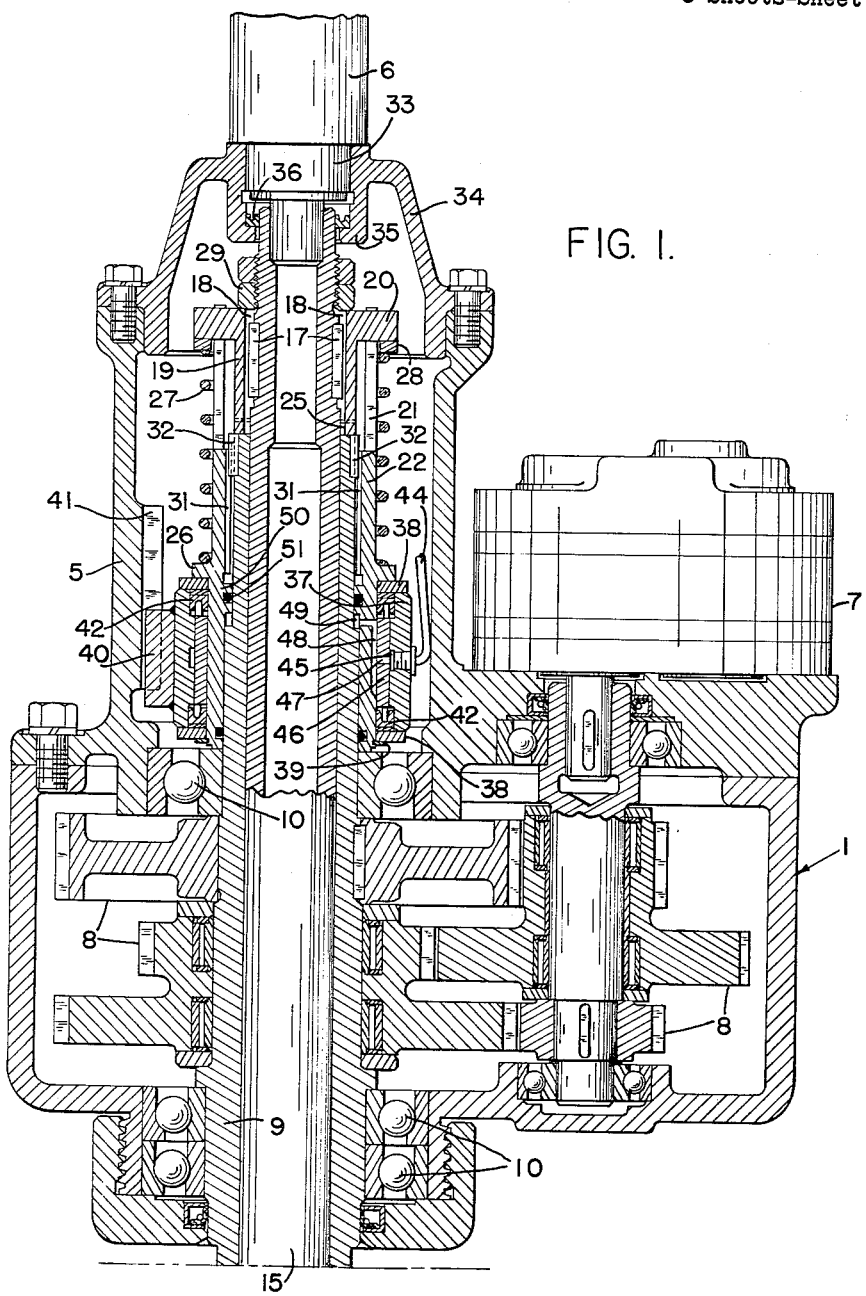

FIGS. 10, 11, 12 and 13 are detail cross sections taken respectively on lines 10—10, 11—11, 12—12 and 13—13 of FIG. 9.

FIG. 14 is a side view of the rotating sleeve.

FIG. 15 is a side view of the rotating cam member.

FIG. 16 is a fragmentary side view showing the rotating sleeve and cam member in different cooperating relations as indicated in full and dotted lines.

FIG. 17 is a sectional view of the rear coupling member with the rotating mechanism detached therefrom.

The rock drilling machine in which the present invention is embodied has a rotating mechanism, generally designated 1, for a drill rod line 2 which carries a conventional drill bit at its lower end, and a conventional impact motor, not shown, connected within the rod line follows the drill bit into the hole to impart impact blows to the bit as the latter is rotated. Evidently the invention may be embodied in drilling machines of other types.

A casing or gear housing 5 is guided along a guideway, not shown, on a suitable drill mounting and has suitable feeding means whereby the drill rod line and drill bit may be advanced toward the work or retracted from the work as desired. A conventional fluid swivel 6, as later explained, is attached to the top of the housing 5 for supplying fluid under pressure down through the rod line to the drill bit to clear away the cuttings from the bottom of the hole being drilled, in a well known manner.

The rotating mechanism may assume various forms but herein comprises a conventional motor 7, desirably a fluid motor, mounted on the housing and connected through conventional spur reduction gearing 8 to a tubular drive spindle 9 suitably journaled on bearings 10 supported within the housing. The forward portion of this spindle has external splines 11 slidingly interlocked with splineways 12 within a hollow rear coupling member 13 of the tubular rod line 2. Thus when the rod line coupling member is connected with the drive spindle through the splines 11 and splineways 12 the rod line and drill bit may be rotated by the motor 7 through the spur reduction gearing 8.

Now referring to the improved releasable locking means it will be noted that extending axially through the tubular spindle 9 is a tubular locking element or rod 15 having locking elements in the form of lugs 16 at its forward end. The rearward portion of the locking rod has keys 17 engaging keyways 18 extending longitudinally within a rotating cam member or rotatable member 19 provided with a top flange formed with spaced cam engaging elements or lugs 20. These lugs project within and engage spiral cam surfaces or slots 21 on the rearward portion of an actuating member or rotating sleeve 22 mounted on and surrounding the rearward portion of the spindle 9. The forward end of this spindle carries a sealing ring 23 which sealingly engages the exterior periphery of the locking rod 5 (FIG. 2). The cam member 19 is connected as by clutch teeth or lugs 24 to complemental clutch teeth or lugs 25 on the rear end of the spindle 9 so that the cam member and spindle may rotate together. As shown in FIG. 13, the lugs 24 are narrower than the lugs 25 to leave spaces therebetween so that the cam member has limited rotation relative to the non-rotating spindle to permit proper actuation of the locking rod as later explained. As the spindle is driven the lugs are in engagement so that the cam member and rotating sleeve rotate together. The spindle is desirably externally flanged at 26 and engaging the rear face of this flange and encircling the rearward portion of the rotating sleeve is a coil spring 27 which acts against a washer 28 engaging the front face of the rear flange on the cam member 19, for urging the latter rearwardly against a nut 29 threaded on the rearward portion of the locking rod 15 (FIG. 1). The rotating sleeve 22 has internal splineways 31 slidingly engaging keys 32 on the rear end of the spindle 9 so that the sleeve and spindle rotate together.

The fluid swivel 6 has a tubular portion 33 extending into the bore of the rear portion of the locking rod 15 (FIG. 1) and a rear head 34 of the housing has an annular portion 35 surrounding the rear end of the locking rod and carrying a sealing ring 36 which sealingly engages the exterior periphery of the locking rod to reduce fluid leakage. Thus cleansing fluid may flow from the swivel down through the locking rod and hollow rod line to the drill bit to clear away the cuttings from the bit face.

In this improved construction an annular swivel or annular member 37 surrounds the rotating sleeve 22 between bearing washers 38, the latter respectively abutting the sleeve flange 26 and a front lock ring 39 and is held stationary as regards rotation as the sleeve rotates by a lateral lug 40 slidingly received in a longitudinal slot 41 within the housing (FIGS. 9 and 10). Sealing rings 42 within end recesses in the swivel member 37 sealingly engage the exterior periphery of the rotating sleeve 22 to prevent fluid leakage. A fluid connection 43 on the housing leads to a suitable source of fluid under pressure and is connected by a flexible tubing 44 within the housing to an annular groove 45 in the swivel member. The swivel member is mounted on bearing sleeve 46 supported by the spindle and this sleeve has a port 47 communicating with a passage 48 within the sleeve 22 which in turn communicates with an annular space 49 within the sleeve. The rotating sleeve has an internal annular piston 50 carrying a sealing ring 51 engaging the exterior periphery of the spindle 9 and when fluid under pressure is supplied to the space 49 the front face of the piston is subjected to the action of pressure fluid to shift the sleeve 22 axially rearwardly relative to the spindle against the action of the coil spring 27. When the locking rod 15 is in the position as shown in FIG. 3, that is with the lugs 16 in advance of the forward end of the coupling member 13 rearward movement of the sleeve 22 causes the cam slots 21 engaging the cam lugs 20 on the cam member 19 to rotate the latter and the locking rod, through the keys 17 and keyways 18 relative to the spindle 9, to bring the locking lugs 16 into alignment with longitudinal slots or grooves 52 on the coupling member 13 which grooves are in alignment with the splineways 12 on the rear coupling member 13.

During unlocking of the locking rod 15 from the coupling 13 the rod line 2 must be suitably supported at its lower end against axial downward movement, as for example with the bit resting on the hole bottom, and the drill rotation mechanism 1 may then be fed slightly downwardly relative to the rod line to release the locking lugs 16 from locking recesses 53 in the front face of the rear rod coupling member 13, as shown in FIG. 3. The splines 11 and splineways 12 are of such length as to remain in coupled relation during any forward movement of the spindle 9 relative to the coupling 13. Thus when the parts are located as shown in FIG. 3 and with the rotation mechanism 1 stopped, the locking rod may be rotated by the rotation of the cam member 19 relative to the spindle 9 by the rearward actuation of the sleeve 22 to turn the rod locking lugs 16 from alignment with the recesses 53 into alignment with the slots 52, as shown in FIG. 8. The rotating mechanism may then be fed rearwardly to move the rotation spindle and locking rod outwardly from within the rear coupling member while the latter remains stationary in its supported position on the hole bottom. When the space 49 at the front side of the piston 50 is suitably vented the coil spring 27 retracts the sleeve 22 and the swivel parts mounted thereon to turn the locking rod back to its locking position with the locking lugs out of registry with the locking grooves 52 and in registry with the locking recesses 53 in the rear coupling member and when the rotation mechanism is retracted slightly relative to the rear coupling member the locking lugs 16 are brought into locked position within the locking recesses 53, as shown in FIG. 2, again preventing relative longitudinal separation of the drive spindle 9 from the coupling 13 secured to the drill rod line.

As a result of this invention, an improved rotation means for a drill rod line is provided whereby the latter may be readily connected to the rotation means or disconnected therefrom. The improved releasable means for locking the rod line to or disconnecting the same from the drill rotation mechanism is operatively connected to an element of, and is embodied in, the rotation mechanism resulting in simplification and compactness. By the provision of the locking rod extending axially through the rotation spindle it is possible to enter the relatively inaccessible interior of the rod line coupling at the forward end of the spindle to engage and to actuate the locking rod by means located at the rear end of the spindle. By locating the power actuator and the locking rod at the rear end of the drive spindle with parts rotating with the latter the operating connections and fluid supply are simplified. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a drilling machine, a rotating mechanism for a drill rod line, a hollow coupling member rigidly secured to the rear end of the rod line, said rotating mechanism including a hollow drive spindle, means on said coupling member and the forward end of said spindle for interlocking said coupling member and spindle for rotation in unison while permitting longitudinal separation thereof, means for preventing longitudinal separation of said spindle and coupling member comprising a locking rod extending axially through said hollow spindle and for the full length thereof, locking lug elements on the forward end of said locking rod engageable in one position with the forward portion of said coupling member to prevent such separation of said spindle and coupling member, a rotatable member connected to said locking rod and to the rear end of said spindle and having means thereon providing for limited rotation of said rotatable member relative to said spindle, an actuating member within the interior of the drilling machine connected to said spindle and to said rotatable member and shiftable axially relative to said spindle, and means actuated by axial shifting movement of said actuating member for effecting rotation of said locking rod relative to said spindle, whenever said locking lug elements are out of engagement with said coupling member, to move said lug elements on said locking rod to another position relative to said coupling member to permit longitudinal separation of said spindle from said coupling member.

2. In a drilling machine as set forth in claim 1 wherein said lug elements on said locking rod when in said one position serves to support the rod line against forward axial movement relative to said spindle.

3. In a drilling machine as set forth in claim 1 wherein a portion of said interlocking means on said coupling member also provides a passageway through which said lug elements pass upon the movement of said drilling machine in the direction away from said drill rod line to permit longitudinal separation of said spindle from said coupling member.

4. In a drilling machine as set forth in claim 1 wherein the means providing for limited rotation of said rotatable member relative to said spindle comprising complemental clutch teeth on said rotatable member and said spindle, the teeth on said rotatable member being narrower than the teeth on said spindle to leave spaces therebetween to permit the aforesaid rotation of said rotatable member relative to said spindle.

5. In a drilling machine as set forth in claim 1, wherein said means actuated by said actuating member being in the form of cam elements on said rotatable member which cooperate with cam surfaces on said actuating member for imparting a rotative movement to said rotatable member upon the shifting axially of said actuating member relative to said spindle.

6. In a drilling machine as set forth in claim 5 wherein said actuating member is connected to the rearward portion of said spindle remote from the end of said spindle which is interlocked with said coupling member in axial alignment therewith and within the confines of the drilling machine.

7. In a drilling machine as set forth in claim 6 wherein said actuating member has associated therewith means providing a piston and cylinder structure subjected to fluid pressure for moving said actuating member in one direction relative to said spindle and rotatable member.

8. In a drilling machine as set forth in claim 7 wherein a resilient element positioned between said rotatable and actuating members, respectively, is provided for moving said actuating member in the opposite direction.

9. In a drilling machine as set forth in claim 1 wherein said coupling member at the forward end thereof is provided with recesses for the reception of said lug elements on said locking rod when said lug elements are in said one position to positively interlock said locking rod, spindle and coupling member for rotating in unison.

10. In a drilling machine as set forth in claim 9 whereupon said lug elements are moved out of said recesses upon forward longitudinal movement of said locking rod and spindle relative to said coupling member upon feeding movement of the drilling machine to effect the drilling operation and permits said lug elements to be moved by said actuating member to the position whereby said spindle and locking rod may be separated from the drill rod line upon rearward movement of the drilling machine in a direction away from the rod line.

References Cited in the file of this patent
UNITED STATES PATENTS

| | | |
|---|---|---|
| 2,049,289 | Burns et al. | July 28, 1936 |
| 2,863,638 | Thornburg | Dec. 9, 1958 |
| 2,914,305 | Wink | Nov. 24, 1959 |